United States Patent Office 3,732,337
Patented May 8, 1973

3,732,337
THERMOPLASTIC CROSSLINKED POLYESTER MATERIAL AND METHOD OF MOLDING
William J. Heilman, Allison Park, Pa., assignor to Gulf Research & Development Company, Pittsburgh, Pa.
No Drawing. Continuation-in-part of application Ser. No. 849,180, Aug. 11, 1969. This application Aug. 27, 1971, Ser. No. 175,759
The portion of the term of the patent subsequent to Feb. 15, 1989, has been disclaimed
Int. Cl. C08f 37/18
U.S. Cl. 260—897 B 12 Claims

ABSTRACT OF THE DISCLOSURE

A polyanhydride, such as a copolymer of maleic anhydride and an alpha-olefin, when heated together with a polymeric polyol, such as polyvivnyl alcohol, yields a polyester crosslinked material. When heated to a temperature in excess of 80° C., this crosslinked polyester material flows and can be molded. On slow cooling, this material may again become crosslinked and insoluble in solvents such as acetone.

---

This invention relates to a discovery that certain polyanhydride compounds when reacted with polymeric polyols will produce a reaction product which possesses the properties of both thermoplastic and thermosetting resins. This application is a continuation-in-part of my copending Ser. No. 849,180 filed Aug. 11, 1969, now U.S. Pat. No. 3,642,726.

The resin art has long sought a resin capable of bridging the gap between the thermosetting and thermoplastic resins. The thermoset resins are typically hard and exhibit a high degree of resistance to chemical solvents. Once crosslinked, however, they become insoluble and infusible, making further manipulation impossible. The thermoplastic resins, on the other hand, are readily fusible but remain soluble and more amenable to chemical attack. A material which combines the most desirable features of both types of resins, that is, a material which is crosslinked so as to be insoluble in chemical solvents and yet which will also flow sufficiently upon heating so as to be remoldable is, to date, a most sought after material.

Indicative of the efforts made previously to obtain a resin which combines the desirable features of both thermosetting and thermoplastic resins in U.S. Pat. 3,272,771, dealing with the preparation of the so-called "ionomers." The resin described and claimed in the above patent is an ethylene copolymer containing carboxylic acid groups. The copolymer is crosslinked by reacting the acid groups with inorganic compounds. This system is thermoplastic when hot; however, when cool it is crosslinked by an ionic bond to a metal atom, hence the term ionomer. These resins do not have conventional crosslinks of covalent bonds. In addition the acid salt is subject to ionization by many solvents and chemicals and is neither strong nor inert as the covalent bond crosslink.

The invention as described and claimed herein represents a significant advance in the synthesis of compounds which combine both thermoplastic and thermosetting properties. One aspect of this invention is that the resin is crosslinked through covalent bonds which are stronger than the ionic bonds obtained by the prior art, thus approaching more closely the type of bonding found in the thermosetting resins. The resins when cooled demonstrate thermosetting properties, such as insolubility in acetone, yet when heated flow like thermoplastic materials and are capable of being molded in conventional fabricating and molding equipment. These advantages allow the material of the subject invention to avoid the special techniques necessary for the molding and fabricating of thermosetting and elastomeric resins.

In accordance with the invention, a method has been discovered for the preparation of a crosslinked composition of matter which is insoluble in acetone and capable of flowing and being molded at temperatures in excess of 80° C. The method comprises reacting (1) an organic copolymer containing at least one cyclic anhydride group where the carbonyl groups

of the cyclic anhydride groups are directly connected to adjacent internal aliphatic carbon atoms and where one of the carbon atoms adjacent said aliphatic carbon atoms contains a substituent larger than hydrogen which is not part of the polymeric chain with (2) a polymeric polyol possessing at least two hydroxyl groups directly attached to aliphatic carbon atoms under esterification conditions and wherein the equivalent ratio of the hydroxyl groups in the polymeric polyol to the anhydride groups in the copolymer is from 0.5:1 to 20:1.

In one aspect of this invention a process has been developed which comprises:

Heating the solid reaction product of (1) an organic copolymer containing at least one cyclic anhydride group where the carbonyl groups

of the cyclic anhydride groups are directly connected to adjacent internal aliphatic carbon atoms and where one of the carbon atoms adjacent said aliphatic carbon atoms contains a substituent larger than hydrogen which is not part of the polymeric chain and (2) a polymeric polyol possessing at least two hydroxyl groups directly attached to aliphatic carbon atoms and wherein the equivalent ratio of the hydroxyl groups in the polymeric polyol to the anhydride groups in the copolymer is from 0.5:1 to 20:1 to a temperature above the flow temperature of said solid reaction product and Thereafter reforming said solid reaction product by decreasing the temperature to below said flow temperature.

One of the components which is utilized in the method of this invention is an organic copolymer containing at least one cyclic anhydride group where the carbonyl groups

of the cyclic anhydride groups are directly connected to adjacent internal aliphatic carbon atoms and where one of the carbon atoms adjacent said aliphatic carbon atom contains a substituent larger than hydrogen which is not a part of the polymeric chain. The organic copolymer, therefore, always has more than four carbon atoms in a straight chain and the carbonyl groups of the anhydride must be directly attached to adjacent internal aliphatic carbon atoms. In addition, one of the carbon atoms adjacent a carbon atom containing the carbonyl function of the anhydride group must contain a substituent, not a part of the polymer chain, which is larger than hydrogen. By "internal carbon atoms" is meant carbon atoms which do not terminate the carbon chain in the organic compound. The process of this invention is not applicable to aliphatic cyclic anhydrides where the carbonyl groups are on the terminal carbon atoms, such as succinic anhydride; to cyclic anhydrides where the carbonyl groups are directly attached to an aromatic ring, such as phthalic anhydride; or to aliphatic cyclic anhydrides where the carbon atoms adjacent to the cyclic anhydride groups contain only hydrogen substituents, such as ethylene-maleic anhydride copolymers.

The preferred charge stocks are organic compounds containing at least one divalent radical having the formula:

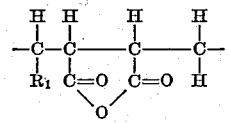

where $R_1$ is a hydrocarbon radical having from one to 48 carbon atoms, preferably from four to 18 carbon atoms. By the term "hydrocarbon radical" in this application is meant any group of atoms consisting of carbon and hydrogen, such as alkyl, cycloalkyl, aryl, alkaryl and aralkyl. Unless otherwise indicated, the term "alkyl" is meant to include only saturated groups. The term "hydrocarbon radical" is therefore intended to substantially exclude olefinic unsaturation in the radicals unless otherwise indicated.

The preferred charge stocks are those prepared by the copolymerization of maleic anhydride and an alpha-olefin having from three to 50, preferably six to 20, carbon atoms per molecule.

The maleic anhydride-alpha-olefin copolymers have the formula:

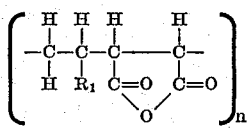

where $R_1$ is as defined and $n$ is an integer from two to 100.

The more preferred charge stocks are those having the formula:

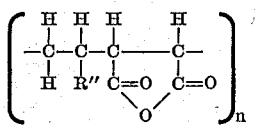

where $R''$ is a hydrocarbon radical having from two to 20 carbon atoms and $n$ is an integer from two to 100, usually from 10 to 50.

The cyclic anhydride containing charge stocks for use in the process of this invention can be prepared in any suitable manner, and their method of preparation or source is not critical. Thus, organic copolymers containing the defined cyclic anhydride groups can be purchased and converted to the desired half-esters in high purity by reaction with an alcohol to be defined below under conditions to be defined below.

The process of the present invention is particularly applicable, however, to the preparation and recovery of half-esters of copolymers of olefinically unsaturated compounds, such as alpha-olefins having at least three carbon atoms with maleic anhydride, which copolymers contain a plurality of internal cyclic anhydride groups. These copolymers are generally prepared by methods well known in the art. It is most convenient to perform the polymerization reaction in the presence of a liquid organic diluent which is at least a solvent for the monomers involved in the reaction.

One of the monomers is maleic anhydride, i.e.

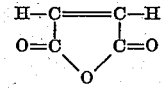

It is preferred that the maleic anhydride be substantially free of maleic acid. The maleic anhydride will, of course, react with water to form the undesired maleic acid. Commerical maleic anhydride is suitable for use in the process of this invention, but in the event it is exposed to water and thereby becomes contaminated with maleic acid, means should be employed to remove the maleic acid before the maleic anhydride is used in the subject process. One suitable method of purifying the maleic anhydride is to dissolve the maleic anhydride in a liquid, such as benzene, which is a solvent for the maleic anhydride but a non-solvent for the maleic acid. The acid can then be separated by filtration or otherwise and the maleic anhydride recovered by evaporation of the benzene.

The maleic anhydride monomer can be copolymerized with an olefinic compound as represented by the general formula:

where $R_1$ is as defined above, i.e. a hydrocarbon radical having from one to 48, preferably from four to 18, carbon atoms. The olefinic compound suitably has from three to 50 carbon atoms per molecule, preferably from three to 20, and more preferably from six to ten carbon atoms per molecule.

The preferred olefinic compounds for use in forming the solid polyanhydride are the aliphatic alpha-monoolefins, and in particular, the straight-chain alpha-monoolefins having from three to 20 carbon atoms per molecule.

It is understood that the term "olefin" is meant to include mixtures of monoolefins having from three to 50 carbon atoms per molecule, such as those obtained by the thermal or catalytic cracking of petroleum stocks. It is desirable that only one olefinic bond per molecule be present in the olefin. Minor amounts of diolefin, on the order of two percent or less, can, however, be tolerated in the olefin.

Examples of olefin compounds or mixtures of olefins suitable as co-monomers include:

| | |
|---|---|
| 2-butene; | 1-pentene; |
| 2-pentene; | 2-methyl-1-butene; |
| propylene; | 1-hexene; |
| 1-butene; | styrene; |
| 3-hexene; | 2-methyl-4-propyl-3-heptene; |
| 4-methyl-1-pentene; | 1-dodecene; |
| 1-heptene; | 1-tridecene; |
| 3-ethyl-2-pentene; | 1-tetradecene; |
| 3,3-dimethyl-1-pentene; | tetraisobutylene; |
| 1-octene; | 2-octadecene; |
| 2-methyl-1-heptene; | 1-eicosene; |
| 3,3-dimethyl-1-hexene; | 2-methyl-1-nonadecene; |
| 1-nonene; | 1-docosene; |
| 4-nonene; | 1-heptacosene; |
| 4,4-dimethyl-1-heptene; | 1-hentriacontene; |
| 1-decene; | 3-heptadecyl-2-eicosene; |
| 2-decene; | 2-methylpentene-1; |
| 1-undecene; and | 2-methylbutene-1. |

The copolymerization can be conducted in any suitable manner. One suitable copolymerization procedure involves contacting the olefinic compound with the maleic anhydride in a suitable solvent in the presence of a free-radical producing catalyst, such as a peroxide. The ratio of the olefinic compound to the maleic anhydride can vary over a wide range, but is generally between about 1:1 and 5:1, with preferred ranges between 1:1 and 3:1. The particularly preferred molar ratios of olefin to anhydride compound will depend to a large extent on the specific olefins employed. For example, for the copolymerization of aliphatic mono-alpha-olefins and maleic anhydride, the ratio of olefin to anhydride is desirably between about 1:1 and 3:1.

The polymerization reaction is a solution-type polymerization wherein the maleic anhydride and olefin monomers are dissolved in a common solvent. The copolymerization can be initiated by any free-radical producing material well known in the art. The preferred free-radical initiators are the peroxide-type polymerization initiators and the azo-type polymerization initiators. Benzoyl peroxide is the most preferred initiator. Radiation can also be used to initiate the reaction, if desired.

The peroxide-type free-radical initiator can be organic or inorganic, the organic peroxides having the general formula:

$$R_7OOR_8$$

where $R_7$ is any organic radical and $R_8$ is selected from the group consisting of hydrogen and any organic radical. Both $R_7$ and $R_8$ can be organic radicals, carrying if desired, substituents such as halogens, etc. The most preferred peroxides are the diaroyl and diacyl peroxides.

Examples of suitable peroxides, which in no way are limiting, include benzoyl peroxide; lauroyl peroxide; tertiary butyl peroxide; 2,4-dichlorobenzyl peroxide; tertiary butyl hydroperoxide; cumene hydroperoxide; diacetyl peroxide; acetyl hydroperoxide; diethylperoxycarbonate; tertiary butyl perbenzoate; and the various compounds, such as the perborates.

The azo-type compounds, typified by alpha,alpha'-azo-bis-isobutyronitrile, are also well-known free-radical promoting materials. These azo compounds can be defined as those having present in the molecule group —N=N—; wherein the valences are satisfied by organic radicals, at least one of which is preferably attached to a tertiary carbon. Other suitable azo compounds include, but are not limited to, p-bromobenzenediazonium fluoborate; p-tolyldiazoaminobenzene; p-bromobenzenediazonium hydroxide; azomethane and the phenyldiazonium halides. A suitable list of azo-type compounds can be found in United States Patent 2,551,813, issued May 8, 1951 to Paul Pinkney.

The amount of initiator to employ, exclusive of radiation, of course, depends to a large extent on the particular initiator chosen, the olefin charge stock and the reaction conditions. The initiator must, of course, be soluble in the reaction medium. The usual concentrations of initiator are between 0.001:1 and 0.1:1 mole of initiator per mole of maleic anhydride, with preferred amounts between 0.005:1 and 0.03:1. In general, the more reactive olefins, such as the vinylidene-type, require smaller amounts of the initiator.

The polymerization temperature must be sufficiently high to break down the initiator to produce the desired free-radicals. For example, using benzoyl peroxide as the initiator, the reaction temperature can be between 75° C. and 90° C., preferably between 80° C. and 85° C. Higher and lower temperatures can be employed, a suitable broad range of temperatures being between 20° C. and 200° C., with preferred temperatures between 50° C. and 120° C.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 1000 p.s.i.g. or higher, but the preferred pressure is atmospheric.

The reaction time is usually sufficient to result in the substantially complete conversion of the maleic anhydride monomer to copolymer. The reaction time is suitably between one and 24 hours, with preferred reaction times between two and ten hours.

As noted above, the subject reaction is a solution-type polymerization reaction. The olefin, maleic anhydride, solvent and initiator can be brought together in any suitable manner. The important factors are intimate contact of the olefin and maleic anhydride in the presence of a free-radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitable take place in a coil-type reactor where the components are added at one or more points along the coil.

The reaction solvent, as noted above, must be one which dissolves both the maleic anhydride and the olefinic monomer. It is necessary to dissolve the maleic anhydride and olefinic monomer, so as to bring them into intimate contact in the solution polymerization reaction. It has been found that the solvent must also be one in which the resultant copolymers are soluble, but not so soluble that the copolymers cannot be precipitated out of solution by the addition of a non-solvent for the copolymers.

Suitable solvents include liquid saturated or aromatic hydrocarbons having from six to 20 carbon atoms; ketones having from three to five carbon atoms; the liquid saturated aliphatic dihalogenated hydrocarbons having from one to five carbon atoms per molecule, preferably from one to three carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the maleic anhydride and olefin monomers in addition to the resulting copolymers. The volume ratio of solvent to olefinic monomer is suitably between 1:1 and 100:1 and is preferably between 1.5:1 and 4:1.

The preferred solvents are the saturated hydrocarbons having from six to ten carbon atoms and the saturated dichlorinated hydrocarbons having from one to five, more preferably one to three, carbon atoms.

Examples of suitable solvents include, but are not limited to:

(1) saturated hydrocarbons such as:

| hexane; | octane; and |
| pentane; | isooctane |
| heptane; | |

(2) aromatic hydrocarbons such as:

| benzene | toluene |
| xylene; and | | and (3) saturated dihalogenated hydrocarbons such as:

| dichloromethane; | 1,2-dibromo-2-methylpropane; |
| dibromomethane; | 1,2-dichloropropane; |
| 1-bromo-2-chloroethane; | 1,1-dichloropropane; |
| 1,1-dibromoethane; | 1,3-dichloropropane; |
| 1,1-dichloroethane; | 1-bromo-2-chloropropane; |
| 1,2-dichloroethane; | 1,2-dichlorobutane; |
| 1,3-dibromopropane; | 1,5-dibromopentane; and |
| 1,2-dibromopropane; | 1,5-dichloropentane. |

The molecular weight of the polyanhydride can vary over a wide range. The inherent viscosity (which is a measure of molecular weight) of five grams of the polyanhydride per deciliter of acetone at 77° F. can suitably be between about 0.05 and 1.5 deciliters per gram and is usually from 0.08 to 0.20 deciliters per gram.

Compounds containing the cyclic anhydride groups as defined above are reacted with a non-aromatic polymeric polyol having at least two hydroxyl groups directly attached to aliphatic carbon atoms and preferably containing between 10 and 100 hydroxyl groups directly attached to aliphatic carbon atoms. By a "non-aromatic polymeric polyol" is meant a polyhydroxylated polymer where the alcoholic hydroxyl groups are not directly connected to an aromatic ring. The polymeric polyol can be saturated or unsaturated and substituted or unsubstituted. Suitable substituents include halogens, especially chlorine; —OR where R is a hydrocarbon radical having between 1 and 20 carbon atoms; nitro; and $$-O-\overset{O}{\underset{}{C}}-\overset{R_2}{\underset{}{C}}=CH_2$$

where $R_2$ is hydrogen or $CH_3$. The preferred polymeric polyols include polyvinyl alcohol and cellulose, which are high boiling (usually above 100° C. at 760 mm. of Hg) and have a plurality of hydroxyl groups, usually more than 2. Polyvinyl alcohols are more completely described in the Kirk-Othmer Encyclopedia of Chemical Technology, 2nd edition, vol. 21, pages 353 et seq., and the description contained in this encyclopedia is incorporated herein by reference.

Other suitable polymeric polyols include the reaction product of styrene with hydroxylated esters of acrylic and methacrylic acid, for example, the reaction product of styrene with 2-hydroxy propylmethacrylate. Also of interest are the copolymers of glycidyl methacrylate with styrene or methylmethacrylate where at least two of the epoxy groups have been reacted to form hydroxyl groups.

It is also possible, and is within the purview of the invention, that a single molecule could have both the polyanhydride and polyol characteristics and be cross-linked through intramolecular esterification. For example, a copolymer of 2-methoxypropylmethacrylate and maleic anhydride containing at least two molecules of each monomer would be satisfactory.

The reaction between the polyanhydride compounds and the polyol is in the nature of an esterification reaction. So long as the proper ratio of the polymeric polyol to the polyanhydride is maintained in the reaction zone, the final product, whether prepared thermally or catalytically, will retain the characteristics of flowing at temperatures exceeding the flow temperature of the product, usually above 80° C., even though the hard products at room temperature are insoluble in acetone. The equivalent ratio of hydroxyl groups in the polymeric polyol to anhydride groups in the copolymer is suitably from 0.5:1 to 20:1 and is preferably from 1:1 to 5:1. However, it is undesirable to achieve total esterification since it is believed to be the breaking of half-ester linkages which renders the product remoldable under the influence of heat and pressure. As a practical matter, the esterification reaction is difficult to promote past the half-ester stage so that total esterification is unlikely even though high ratios of hydroxyl groups to anhydride groups are employed.

The esterification reaction may occur either thermally or catalytically. The advantage of the thermal process is that it is slower and can be followed more closely by, for example, infrared analysis, to insure that a product having the desired percentage of esterification is obtained.

The reaction temperature to promote the esterification reaction between the polymeric polyol and the polyanhydride is suitably between 40° C. and 180° C. The initial reaction temperature can be an elevated temperature of between, for example, 100° C. to 120° C., but at least the final portion of the reaction should be run at a temperature below about 80° C. if it is desirable to react substantially all of the anhydride groups in the polyanhydride since at temperatures exceeding 80° C. an equilibrium exists which prevents at least a portion of the anhydride groups from reacting. It has been found that even though water is not removed from the reaction zone, a greater than 50 percent esterification, for example, to an esterification of 70 percent, can occur.

The reaction pressure is not critical, but should be such that the reactants and products are maintained in the liquid phase. Suitable reaction pressures include atmospheric to 100 p.s.i.g. or higher.

Optionally, a catalyst can be employed to promote the esterification reaction. The catalyst for this reaction can be any material having an ionization constant at 25° C. of at least about $1 \times 10^{-3}$. Suitable catalysts include liquid mineral acids having the required ionization constants, for example, sulfuric, hydrochloric, nitric and phosphoric acids; organic acids, such as benzene sulfonic and p-toluene sulfonic acids which are readily soluble in the reaction medium; and solid acidic materials including, but not limited to, ion exchange resins. The mineral acids normally come in aqueous solution, and concentrations in aqueous solution between 25 percent and 100 percent are suitable. Concentrations of acid below about 25 percent are especially unsuitable when the higher carbon number (above four) alcohols are employed since the water will form a separate phase in the reactor.

Other suitable acid catalysts include hydrobromic acid; perchloric acid; trichloroacetic acid; iodic acid; and picric acid.

The amount of liquid acid catalyst to employ can vary over a wide range. Usually the weight percent of anhydrous acid based on the weight of copolymer is between 0.05 and five, with preferred anhydrous acid concentrations between 0.1 and one weight percent.

Most of the polyanhydride compounds used as a charge stock to prepare the compositions of this invention are solid under normal conditions. The polymeric polyols are also solids and are suitably intimately admixed on a ball mill or other apparatus so that interaction of the alcoholic hydroxyl groups with the anhydride groups of the polyanhydride is encouraged.

If desired, a mutual solvent can be employed for both of the reactants and solution polymerization can take place. The copolymer gel which is formed can be separated from the reaction solvent by evaporation of the solvent or other suitable procedure.

The reaction time should be sufficient to result in the formation of the desired percentage of esterification. The usual reaction time is from ½ to 50 hours or more, depending upon whether a thermal or catalytic reaction is employed and on the nature of the reactants. Usual times are from 0.1 to eight hours.

The reaction can be stopped at any suitable place by following the reaction with suitable means such as infrared analysis until the desired amount of anhydride carbonyl absorption peaks disappear. For example, product samples can be removed periodically and subjected to analysis to determine the proportion of carbonyl groups which are still present as anhydride groups. When the desired percentage esterification has occurred, the reaction can be stopped by lowering of reaction temperatures of by other suitable means.

The reaction can be run in a batch or continuous manner.

The reaction products are suitably recovered under conditions such that the temperatures are maintained below about 80° C., preferably between 0° and 60° C. The reaction products are gel-like when in solution and thus are not true solutions.

It has been found that the solid reaction products defined above are unusual and unique in their ability at room temperature to be insoluble in organic solvents such as acetone, which is a characteristics of a thermosetting resin, and yet possesses the quality of flowing upon the application of heat. Thus, it is possible to reform the above described solid reaction products with the application of heat in the normal conventional molding processes.

In one aspect of this invention, a process has been discovered which comprises:

Heating the solid reaction product of (1) an organic copolymer containing at least one cyclic anhydride group where the carbonyl groups

of the cyclic anhydride groups are directly connected to adjacent internal aliphatic carbon atoms and where one of the carbon atoms adjacent said aliphatic carbon atoms contains a substitutent larger than hydrogen which is not a part of the polymeric chain and (2) a polymeric polyol possessing at least two hydroxyl groups directly attached to aliphatic carbon atoms and wherein the equivalent ratio of the hydroxyl groups in the polymeric polyol to the anhydride groups in the copolymer is from 0.5:1 to 20:1;

Molding said reaction products; and

Cooling said reaction product to a solid form.

By "molding" in this application is meant any process which reforms the solid crosslinked product defined above by heating to a temperature in excess of 80° C. Suitable molding procedures may include extrusion, compression molding, injection molding, which terms will be readily understood by those having ordinary skill in this art. As noted, the molding procedure should occur at a temperature in excess of 80° C. to insure that the solid compositions defined above are in a sufficient state of flow so that they may be molded readily. A suitable range of molding temperatures can be from 80° C. to 250° C. but is preferably between 150° C. and 200° C. The state of flow suitable for molding is usually under stress, i.e. pressure to reduce volatility and keep the temperature requirements to a minimum. Thus, molding pressures of atmospheric to 20,000 p.s.i.g. or more are suitable.

While it is not certain, it is believed that when the temperature is increased above the flow temperature of the reaction product, i.e. about 80° C., a sufficient number of half-ester linkages are broken to cause the reaction product to flow, but not so many linkages are broken as to result in any noticeable volatilization, and certainly no removal, of the polymeric polyol. The minimum temperature to produce flow is about 80° C. Preferably, the flow temperature is from about 80° C. to 200° C., although temperatures of up to 250° C. can be employed. Similarly, the time of maintianing the heated reaction products at temperatures above 80° C. should be minimized to aid in preventing or reducing volatilization. Normally the time is very short, on the order of five to 30 minutes, although the time is not a critical factor and can be any suitable time, for example, several hours or more, so long as care is taken by the use of pressure or otherwise to prevent any possible volatilization.

After molding, the product is cooled to be a reformed solid at ambient temperatures. It is preferred to cool the molded product slowly to permit sufficient time and temperature for the half-ester linkages to reform. The rate of cooling is usually from 1° C. to 5° C. per minute. Fast quenching of the molded products is not desirable, especially if the percentage esterification is low or the molding times were long and/or temperatures high.

The invention will be further described with reference to the following experimental work.

EXAMPLE 1

A polyol was prepared by reacting 20 grams of 2-hydroxypropylmethylate, 20 grams of styrene and 0.4 gram of benzoyl peroxide in 100 milliliters of benzene. The solution was refluxed at 83° C. for 24 hours. The copolymer solution was precipitated by pouring into heptane. The solid copolymer was filtered and dried in a vacuum oven at 50° C. for 20 hours.

The polyanhydride was prepared by reacting 1,470 grams of maleic anhydride, 3,750 milliliters of hexene-1, 36.3 grams of benzoyl peroxide and 750 milliliters of carbon tetrachloride in five liters of ethylene dichloride solvent. The inherent viscosity of the product was 0.093 dl./g. measured in a solution of five grams of copolymer per 100 milliliters of acetone. The molecular weight of the copolymer was 4,400 as measured by vapor pressure osmometry. The chlorine content was 2.11 percent.

Ten grams of each copolymer were admixed on a ball mill for 24 hours. The mixed copolymers were molded at 350° F. for 15 minutes and slowly cooled at room temperature.

The molded plastic disc was insoluble in acetone at 30° C. indicating that the copolymers were crosslinked. When the molded specimen was heated on a hot plate to about 150° C., unlike the crosslinked thermosetting resin, it melted and flowed. On cooling slowly to room temperature a solid product was again formed.

EXAMPLE 2

In the run for this example, 10 grams of a maleic anhydride-hexene-1 copolymer prepared in a manner similar to that described in Example 1 but having an inherent viscosity of 0.095 dl./g. was added to 10 grams of polyvinyl alcohol (Elvanol 51–05) in a 2 oz. round jar. The viscosity of a 4% water solution of the polyvinyl alcohol at 20° C. was 4–6 centipoises and the percent hydrolysis of the polyvinyl alcohol (which is really hydrolyzed polyvinylacetate) was 88–89. The mixture was rolled for four hours on a roller mill, then ground in a mortar and pestle to insure a finely ground, well mixed powder.

Two grams of the mixed powder were then placed in a 1-inch diameter cylindrical steel mold which was then heated to 350° F. between the heated platens of a hydraulic press. 20,000 pounds of ram pressure (about 20,000 p.s.i.) was applied to the powder in the mold and the heat and pressure was maintained for 15 minutes. The heat was shut off and the mold gradually cooled under pressure overnight.

After cooling, the sample (1″ diameter and ⅛″ thick) was removed from the mold and appeared brownish-amber in color. The sample was insoluble in acetone at room temperature, indicating the copolymers were cross-linked. When the molded sample was heated on a hot-plate it flowed, and on cooling slowly to room temperature a solid product was again formed which was insoluble in acetone.

The compositions of this invention satisfy a long felt need in the art for a stable material which has a long shelf life at room temperature and which possesses properties at room temperature of crosslinked thermosetting resins yet which will on heating to relatively low temperatures flow and permit itself to be reformed and molded by conventional procedures.

Resort may be had to such variations and modifications as fall within the spirit of the invention and the scope of the appended claims.

I claim:

1. A method for the preparation of a cross-linked composition of matter insoluble in acetone and capable of flowing and being molded at temperatures in excess of 80° C. which comprises reacting (1) an organic copolymer having the formula:

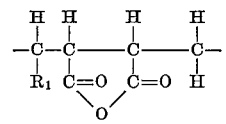

where $R_1$ is an aliphatic hydrocarbon radical having from 1 to 48 carbon atoms and wherein said copolymer the molar ratio of the olefinic portion of the copolymer to the maleic anhydride is about 1:1 with (2) a polymeric polyol possessing at least two hydroxyl groups directly attached to aliphatic carbon atoms under esterification conditions and wherein the equivalent ratio of the hydroxyl groups in the polymeric polyol to the anhydride groups in the copolymer is from 1:1 to 20:1.

2. A method according to claim 1 wherein the copolymer is the reaction product of maleic anhydride and an alpha-olefin having from 3 to 50 carbon atoms per molecule.

3. A method according to claim 1 wherein the polymeric polyol is polyvinyl alcohol.

4. A process according to claim 1 wherein the alpha-olefin is 1-hexene.

5. A process which comprises:

(1) reacting (a) an organic copolymer having the formula:

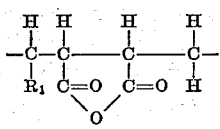

where $R_1$ is an aliphatic hydrocarbon radical having from 1 to 48 carbon atoms and wherein said copolymer the molar ratio of the olefinic portion of the copolymer to the maleic anhydride is about 1:1 with (b) a polymeric polyol possessing at least two hydroxyl groups directly attached to aliphatic carbon atoms under esterification conditions to form a solid reaction product and wherein the equivalent ratio of the hydroxyl groups in the polymeric polyol to the anhydride groups in the copolymer is from 1:1 to 5:1; and (2) heating said solid reaction product to a temperature in excess of 80° C. sufficient to cause said solid reaction product to flow; and (3) thereafter reforming said solid reaction product by decreasing the temperature to below the flow temperature of said solid reaction product.

6. A process which comprises:

heating the solid reaction product of (1) an aliphatic polymeric polyol containing at least two alcoholic hydroxyl groups directly attached to aliphatic carbon atoms with (2) a copolymer of maleic anhydride and an alpha-olefin having from 3 to 50 carbon atoms per molecule wheerin the molar ratio of the alpha-olefin to the maleic anhydride is about 1:1 to a temperature above the flow temperature of said solid reaction product, said temperature being suitable for molding said reaction product; and wherein said reaction product the equivalent ratio of the alcoholic hydroxyl groups in said polymeric polyol to the anhydride groups in said copolymer is from 1:1 to 20:1;

molding said reaction product; and
cooling said reaction product to a solid form.

7. A process according to claim 6 wherein the rate of cooling is from 1° C. to 5° C. per minute.

8. A process according to claim 6 wherein the heating is done under conditions such that no products are removed.

9. A method according to cliam 1 wherein the copolymer is the reaction product of maleic anhydride and an aliphatic alpha-olefin having from 6 to 20 carbon atoms per molecule.

10. A process according to claim 6 wherein the alpha-olefin is an aliphatic alpha-olefin having from 6 to 20 carbon atoms per molecule.

11. A method according to claim 10 wherein the aliphatic alpha-olefin is 1-hexene and the polymeric polyol is polyvinyl alcohol.

12. A method according to claim 1 wherein the polymeric polyol is the reaction product of styrene and 2-hydroxy propylmethacrylate.

References Cited
UNITED STATES PATENTS

| | | | |
|---|---|---|---|
| 3,299,184 | 1/1967 | Withworth et al. | 260—897 |
| 3,408,337 | 10/1968 | Moore | 260—78.5 |
| 3,085,986 | 4/1963 | Muskat | 260—31.8 |
| 3,642,726 | 2/1972 | Heilman | 260—78.5 T |

MURRAY TILLMAN, Primary Examiner

C. J. SECCURO, Assistant Examiner

U.S. Cl. X.R.

260—17.4 U C, 78.5 T, 896, 897 R